US008577225B2

(12) United States Patent
Mure et al.

(10) Patent No.: US 8,577,225 B2
(45) Date of Patent: Nov. 5, 2013

(54) OPTICAL RECEIVER

(75) Inventors: Masahito Mure, Toda (JP); Norikazu Miyazaki, Narashino (JP); Toshio Kataoka, Chiyoda-ku (JP); Kaoru Higuma, Yachiyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 508 days.

(21) Appl. No.: 12/935,252

(22) PCT Filed: Mar. 25, 2009

(86) PCT No.: PCT/JP2009/055962
§ 371 (c)(1),
(2), (4) Date: Sep. 28, 2010

(87) PCT Pub. No.: WO2009/122981
PCT Pub. Date: Oct. 8, 2009

(65) Prior Publication Data
US 2011/0075149 A1   Mar. 31, 2011

(30) Foreign Application Priority Data
Mar. 31, 2008   (JP) ................................. 2008-093492

(51) Int. Cl.
*H04B 10/06*   (2011.01)
*G01B 9/02*   (2006.01)

(52) U.S. Cl.
USPC ........... 398/202; 398/206; 398/207; 398/213; 356/450

(58) Field of Classification Search
None
See application file for complete search history.

(56) References Cited

U.S. PATENT DOCUMENTS

| 7,324,713 B2* | 1/2008 | Jang et al. ................. 385/1 |
| 7,603,045 B2 | 10/2009 | Hoshida et al. |
| 2007/0058988 A1* | 3/2007 | Yonenaga .................. 398/186 |
| 2008/0175602 A1* | 7/2008 | Mitani et al. .............. 398/202 |
| 2009/0034967 A1 | 2/2009 | Tao et al. |

FOREIGN PATENT DOCUMENTS

| JP | 2005-80304 | 3/2005 |
| JP | 2006-032514 | 2/2006 |
| JP | A-2006-325124 | 11/2006 |
| JP | A-2006-352678 | 12/2006 |
| JP | 2007-20138 | 1/2007 |
| JP | 2007-181171 | 7/2007 |
| JP | 2008-10991 | 1/2008 |
| WO | WO-2005/088876 A1 | 9/2005 |
| WO | WO 2006/070456 | 7/2006 |

OTHER PUBLICATIONS

Office Action for Japanese Patent Application No. 2010-505732 (Aug. 28, 2012).

* cited by examiner

*Primary Examiner* — Shi K Li
*Assistant Examiner* — Merlin Brito Peguero
(74) *Attorney, Agent, or Firm* — Merchant & Gould P.C.

(57) ABSTRACT

Provided is an optical receiver which accurately demodulates an optical signal obtained by the differential phase shift modulation method. The optical receiver includes: an interferometer which branches the inputted optical signal into two parts and gives a one-bit phase difference to the resultant two optical signals so that the two optical signals after addition of the phase difference are made to interfere each other to output two output lights; reflection means which reflects one of the output lights from the interferometer so as to return to the interferometer; detection means which detects the return light which has been reflected by the reflection means and propagates through the interferometer in the different direction from the inputted optical signal, for output; and phase difference control means which adjusts the phase difference given by the interferometer according to the intensity of the return light detected by the detection means.

7 Claims, 4 Drawing Sheets

OPTICAL RECEIVER

This application is a National Stage Application of PCT/JP2009/055962, filed 25 Mar. 2009, which claims benefit of Ser. No. 2008-093492, filed 31 Mar. 2008 in Japan and which application(s) are incorporated herein by reference. To the extent appropriate, a claim of priority is made to each of the above disclosed applications.

TECHNICAL FIELD

The present invention relates to an optical receiver for receiving a differential-phase-shift-keying-modulated optical signal.

BACKGROUND ART

In the related art, a transmission system adapted to modulate and transmit light based on a differential phase shift modulation method has been developed. In the differential phase shift modulation method, bits of information are allocated to the phase difference of waves which are subsequent or precedent by only a single period of the carrier wave (light). Therefore, in order to demodulate the transmitted differential phase shift keying-modulated optical signals with high accuracy, it is necessary for the receiver side to demodulate the optical signal after delaying it accurately by a single period. A technique of delaying the phase difference of the optical signal accurately by a single period during demodulation is disclosed in, for example, Patent Documents 1 and 2.

[Patent Document 1] Japanese Unexamined Patent Application Publication No. 2005-080304

[Patent Document 2] Japanese Unexamined Patent Application Publication No. 2006-032514

DISCLOSURE OF INVENTION

Problems to be Solved by the Invention

However, in the technique disclosed in Patent Document 1, the phase differences are controlled depending on the electric signal obtained by photoelectrically converting the optical signal. Therefore, many losses are generated in the electric signal.

In addition, in the technique disclosed in Patent Document 2, it is necessary to perform complicated control.

The present invention has been made to address the aforementioned problems and provide an optical receiver capable of demodulating the optical signal based on a differential phase-shift modulation method with high accuracy using a simple and easy configuration having little loss.

Means for Solving the Problems

In order to address the aforementioned problems, the present invention provides an optical receiver that receives a differential-phase-shift-keying-modulated optical signal, the optical receiver including: an interferometer that branches the received optical signal into two paths, introduces a phase difference corresponding to a single bit between the two branched optical signals, and generates interference between the two optical signals after introduction of the phase difference so as to output two output optical signals; a reflection means that reflects one of the output optical signals from the interferometer to return one of the output optical signals to the interferometer; a detection means that detects the return light output after being reflected by the reflection means and passing through the interferometer in a reversed direction to the received optical signal; and a phase difference control means that adjusts the phase difference introduced by the interferometer based on an intensity of the return light detected by the detection means.

According to the present invention, in the optical receiver described above, the phase difference control means adjusts the phase difference such that an average intensity of the return light is maximized.

According to the present invention, in the optical receiver described above, the phase difference control means adjusts the phase difference such that an average intensity of the return light is minimized.

In order to achieve the aforementioned objects, the present invention provides an optical receiver for receiving a differential-phase-shift-keying-modulated optical signal, the optical receiver including: a branching means that branches the received optical signal into two paths; a phase difference introducing means that introduces a relative phase difference of $\pi/2$ between two optical signals branched by the branching means; a first interferometer that branches one of the optical signals branched by the branching means into two paths, introduces a phase difference corresponding to a single bit between the two branched optical signals, and generates interference between the two optical signals after introducing the phase difference so as to output two output optical signals; a first reflection means that reflects one of the output optical signals from the first interferometer to return one of the output optical signals to the first interferometer; a first detection means that detects the return light output after being reflected at the first reflection means and passing through the first interferometer in a reversed direction; a second interferometer that branches the other optical signal branched by the branching means into two paths, introduces a phase difference corresponding to a single bit between the two branched optical signals, and generates interference between the two optical signals after introducing the phase difference so as to output two output optical signals; second reflection means that reflects one of the output optical signals from the second interferometer to return one of the output signals to the second interferometer; a second detection means that detects the return light output after being reflected at the second reflection means and passing through the second interferometer in a reversed direction; and a phase difference control means that adjusts the phase differences introduced by the first and second interferometers based on at least one of intensities of the return light detected by the first and second detection means.

Further, according to an embodiment of the present invention, in the aforementioned optical receiver, the phase difference control means adjusts the phase difference such that an average intensity of the return light detected by the first detection means is maximized or minimized, or an average intensity of the return light detected by the second detection means is maximized or minimized.

Effects of the Invention

According to the present invention, it is possible to demodulate the optical signal based on a differential phase shift modulation method with high accuracy using a simple and easy configuration having little loss.

EXPLANATION OF REFERENCE

100: optical receiver (light-receiving unit)
101: optical circulator
102: Mach-Zehnder interferometer
103: reflection unit
104 to 106: photodetector unit
107: control unit
108: branching unit
1021: first optical path
1022: second optical path
1023: phase adjustment unit
1024: first input/output unit
1025: second input/output unit
1026: third input/output unit
1027: phase introducing unit
200: optical receiver

BEST MODE FOR CARRYING OUT THE INVENTION

Hereinafter, embodiments of the present invention will be described in detail with reference to the accompanying drawings.

Figure 1:
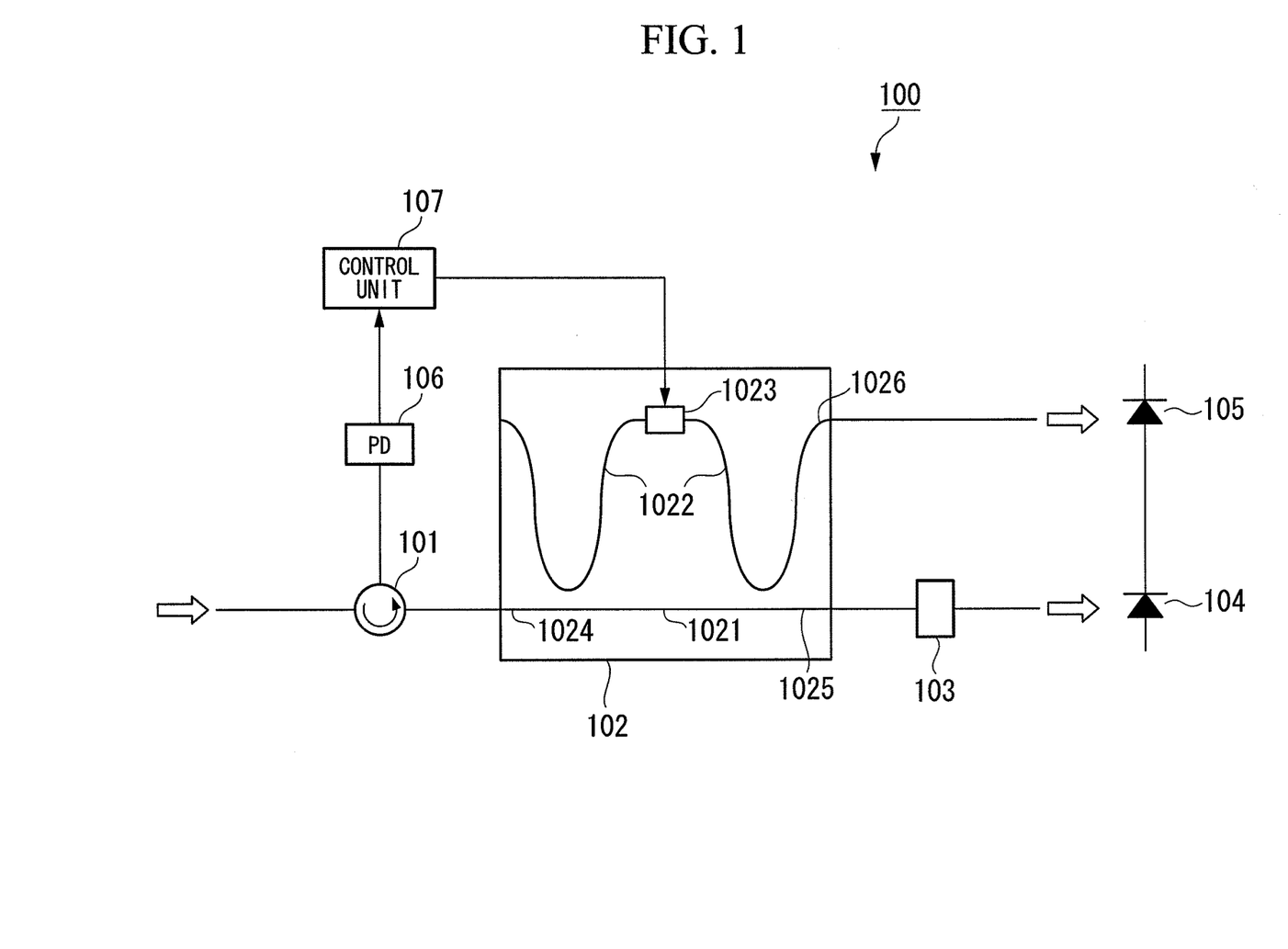
FIG. 1 is a schematic configuration diagram illustrating an optical receiver (using DPSK) according to an embodiment of the present invention.

FIG. 1 is a schematic configuration diagram illustrating an optical receiver according to an embodiment of the present invention. In FIG. 1, the optical receiver 100 includes an optical circulator 101, a Mach-Zehnder interferometer 102, a reflection unit 103, photodetector units 104 to 106, and a control unit 107.

The optical receiver 100 receives the optical signals which have been differential-phase-shift-keying-modulated by an optical transmitter (not shown) and transmitted through an optical path. While the differential phase shift modulation method includes DPSK (Differential Phase Shift Keying), DQPSK (Differential Quadrature Phase Shift Keying) or the like, the following description will be provided by assuming that DPSK (shown in FIG. 2) is used hereinafter.

The differential-phase-shift-keying-modulated (DPSK) optical signal transmitted from the optical transmitter is input to the first input/output unit 1024 of the Mach-Zehnder interferometer 102 through the optical circulator 101. The optical signal input to the first input/output unit 1024 is branched into the first optical path 1021 and the second optical path 1022 at the Mach-Zehnder interferometer 102.

Here, the length of the second optical path 1022 is set to be longer than the length of the first optical path 1021 such that the light propagating through the second optical path 1022 has a delay (phase difference) corresponding to a single bit of the DPSK signal with respect to the light propagating through the first optical path 1021.

The optical signal propagating through the first optical path 1021 and the optical signal propagating through the second optical path 1022 are combined at the Mach-Zehnder interferometer 102 and interfere with each other so as to be output as an output optical signal from the second input/output unit 1025 and the third input/output unit 1026. The two output optical signals are received by the photodetector units 104 and 105 and are converted into electric signals.

Figure 2:
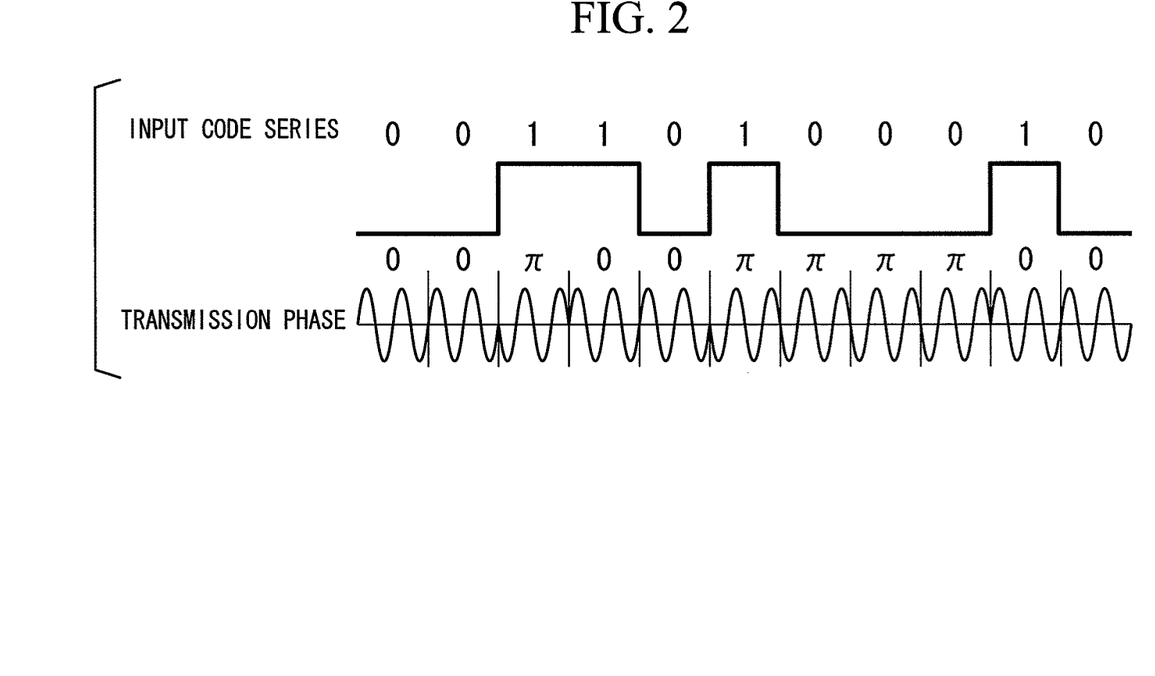
FIG. 2 illustrates differential phase shift keying (DPSK).

Here, a description of the differential phase shift keying (DPSK) will be provided with reference to FIG. 2. According to the DPSK scheme, a first phase "0" is allocated in the case where an arbitrary bit and the bit immediately precedent to the arbitrary bit are equal. Otherwise, a second phase "π" is allocated. For example, referring to FIG. 2, in a transmission code series (a transmitting bit string) of "00110100010", the first bit "0" and the initial bit "0" (a value predetermined as a bit immediately precedent to the first bit) are equal, the first transmission phase is set to "0". In addition, in FIG. 2, the 2 periods of the carrier wave (=1 time slot) correspond to a single bit.

Similarly, since the first bit "0" and the second bit "0" are equal, the second transmission phase is set to "0". Since the second bit "0" and the third bit "1" are different, the third transmission phase is set to "π". Since the third bit "1" and the fourth bit "1" are equal, the fourth transmission phase is set to "0".

In this manner, when a bit string "00110100010" is to be transmitted, a modulated optical signal with phases "00π00ππππ00" is transmitted from the optical transmitter that performs differential phase shift keying (DPSK).

As described above, the optical receiver 100 receives this optical signal, branches the optical signal into two paths of the first optical path 1021 and the second optical path 1022 at the Mach-Zehnder interferometer 102, and introduces a phase difference corresponding to a single bit into the light propagating through two optical paths so as to generate interference. Therefore, the light of an arbitrary time slot through the first optical path 1021 and the light of the immediately precedent time slot delayed by a single bit through the second optical path 1022 interfere with each other. Here, it is assumed that the optical signal is demodulated to a bit "0" when the light having the same phase interfere with each other, and the optical signal is demodulated to a bit "1" when the light having different phases interfere with each other. In this case, the optical signal modulated with the aforementioned phases "00π00ππππ00" interferes at the Mach-Zehnder interferometer 102 so that a bit string transmitted from the optical transmitter can be obtained as follows.

Phase of the light through the first optical path 1021: "00π00ππππ00";

Phase of the light through the second optical path 1021: "00π00ππππ00"; and

Modulated bits: "00110100010".

Returning to FIG. 1, the optical receiver 100 will be described in more detail. The rear stage of the second input/output unit 1025 of the Mach-Zehnder interferometer 102 (between the second input/output unit 1025 and the photodetector unit 104) is provided with the reflection unit 103. Out of the two kinds of output light, a part of the output light output from the second input/output unit 1025 (for example, 1 to 5% of a total light) is reflected at the reflection unit 103 and returns to the second input/output unit 1025. The light returning to the second input/output unit 1025 passes through the Mach-Zehnder interferometer 102 in a reversed direction and is output as the return light from the first input/output unit 1024. The return light is input to the optical circulator and output to the photodetector unit 106 so as to be received by the photodetector unit 106 and converted into an electric signal.

The electric signal representing the intensity of the return light obtained from the photodetector unit 106 is transmitted to the control unit 107. A part of the second optical path 1022 of the Mach-Zehnder interferometer 102 is provided with the phase adjustment unit 1023 that adjusts the phase of the light propagating through the second optical path 1022. The control unit 107 determines the phase adjustment amount of the phase adjustment unit 1023 based on the electric signal representing the intensity of the return light. Hereinafter, a method of controlling the phase adjustment amount by the control unit 107 will be described with reference to FIG. 3.

Figure 3:
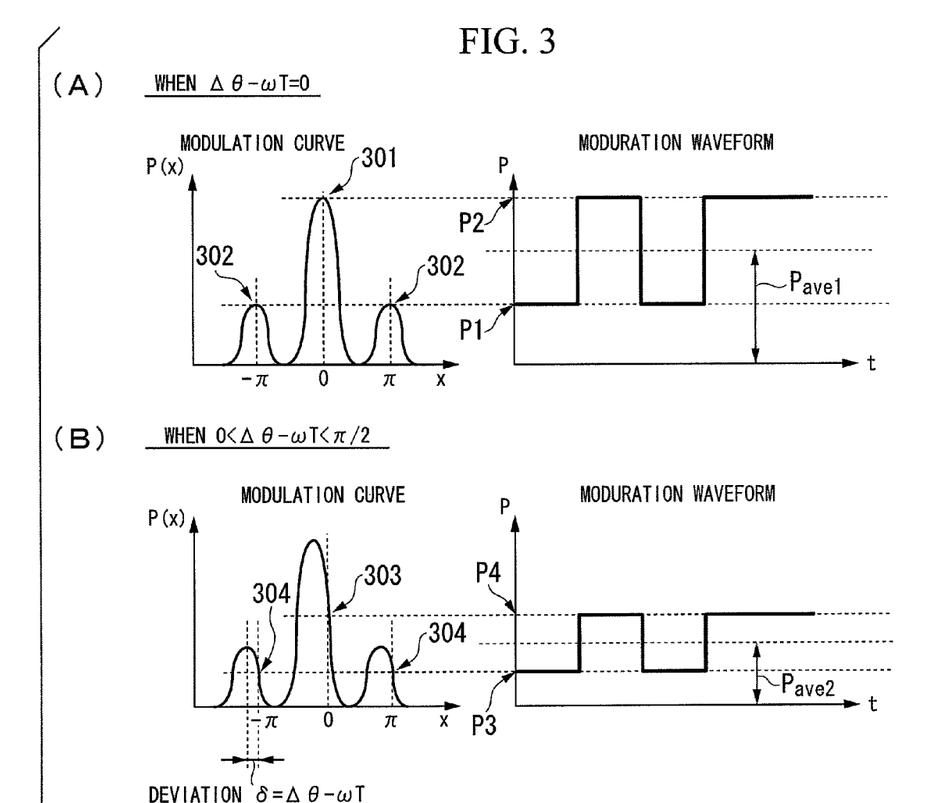
FIG. 3 illustrates an intensity of the return light received at the photodetector unit (PD) of the optical receiver of FIG. 1.

FIG. 3 illustrates an intensity of the return light received by the photodetector unit 106. The intensity P of the return light can be expressed as follows:

$$P \propto |\exp[j\phi(t)] + \exp[j\{\phi(t-T) + \Delta\theta\}]2|^2$$

$$\propto \{2\cos(\phi(t-T) - \phi(t) - \omega T + \Delta\theta)1\}^2,$$

where, $\omega$ denotes a frequency of the carrier wave, $1/T$ denotes a bit rate, $\phi(t)$ denotes a phase of the optical signal input to the optical receiver 100, $\Delta\theta$ denotes a phase adjustment amount introduced by the phase adjustment unit 1023 of the Mach-Zehnder interferometer 102. However, since $\phi(t)=0$ or $\pi$, $\phi(t-T)-\phi(t)$ results in some values such as $-\pi$, 0, or $\pi$.

Therefore, the intensity P of the return light can be expressed as values $P(-\pi)$, $P(0)$, and $P(\pi)$ corresponding to $x=-\pi, 0,$ and $\pi$ on a modulation curve $P(x)=\{2\cos(x-\delta)+1\}^2$ having a first peak 301 and a second peak 302 in FIG. 3. Here, $\Delta\theta-\omega T$ is defined as a deviation $\delta$.

If the deviation $\delta$ is zero (FIG. 3(A)), the intensity of the return light has a value P1 corresponding to the second peak 302 when the phase of the optical signal is $\phi(t-T)-\phi(t)=-\pi$ or $\pi$, and the intensity of the return light has a value P2 corresponding to the first peak 301 when the phase of the optical signal is $\phi(t-T)-\phi(t)=0$. That is, the intensity of the return light received by the photodetector unit 106 becomes P1 or P2 in response to the phase of the optical signal input to the optical receiver 100 so that the modulation waveform illustrated in the drawings is obtained. Here, when it is assumed that the phase $\phi(t)$ of the optical signal input to the optical receiver 100 has a value 0 or $\pi$ with the same probability on average, the intensity P of the return light has a value P1 or P2 with the same probability. Therefore, a time average of the intensity of the return light measured by the photodetector unit 106 becomes $P_{ave1}=(P1+P2)/2$.

Meanwhile, in the case of $0<\delta<\pi/2$ (FIG. 3(B)), the intensity of the return light has a value P3 (<P1) corresponding to the point 304 deviated by the deviation $\delta$ from the second peak 302 when the phase of the optical signal is $\phi(t-T)-\phi(t)=-\pi$ or $\pi$, and the intensity of the return light has a value P4 (<P2) corresponding to the point 303 deviated by the deviation $\delta$ from the first peak 301 when the phase of the optical signal is $\phi(t-T)-\phi(t)=0$. That is, the intensity of the return light received by the photodetector unit 106 becomes P3 or P4 in response to the phase of the optical signal input to the optical receiver 100 so that the modulation waveform illustrated in the drawings can be obtained. In addition, on the assumption in the case when $\delta=0$, the time average of the intensity of the return light measured by the photodetector unit 106 becomes $P_{ave2}=(P3+P4)/2$.

Here, as is apparent from the aforementioned description and FIG. 3, since $P_{ave1}>P_{ave2}$, as the deviation $\delta$ changes, the time average of the intensity P of the return light measured by the photodetector unit 106 changes in response to the change of the deviation $\delta$, and when the deviation $\delta$ is zero, the time average of the intensity P of the return light has a maximum value $P_{ave1}$. Since the state where the deviation $\delta$ is zero exactly corresponds to the state where a delay amount corresponding to a single bit is introduced to the first optical path 1021 and the second optical path 1022 of the Mach-Zehnder interferometer 102, the control unit 107 controls the phase adjustment amount $\Delta\theta$ introduced by the phase adjustment unit 1023 such that the time average of the intensity P of the return light measured by the photodetector unit 106 has a maximum value. As a result of this control, a delay amount exactly corresponding to a single bit is introduced to the first optical path 1021 and the second optical path 1022 of the Mach-Zehnder interferometer 102 at all times. Therefore, the optical receiver 100 can demodulate the received optical signal based on a differential phase shift modulation method with high accuracy.

Hereinbefore, while an embodiment of the present invention has been described in detail with reference to the accompanying drawings, a specific configuration is not limited to the aforementioned description, and the invention may be variously changed in design without departing from the scope or spirit of the invention.

For example, the Mach-Zehnder interferometer 102 and the phase adjustment unit 1023 may have various configurations. By way of an example, the Mach-Zehnder interferometer 102 may be provided by forming an optical waveguide on a substrate made of a material having an electro-optic effect, such as lithium niobate(LiNbO$_3$), and the phase adjustment unit 1023 may be provided by forming an electrode near the waveguide of the substrate, so that the refractive index of the optical waveguide is changed using the electro-optic effect by applying an electric field to the optical waveguide from the electrode to adjust the phase of the light propagating through the optical waveguide. Alternatively, the Mach-Zehnder interferometer 102 may be provided by forming an optical waveguide on a quartz substrate, and the phase adjustment unit 1023 may be provided by forming an electrode near the waveguide of the substrate, so that the refractive index of the optical waveguide is changed using a thermo-optic effect by flowing an electric current through the electrode to heat the electrode to adjust the phase of the light propagating through the optical waveguide. Furthermore, a bulk type optical element such as a mirror or a beam splitter may be used in the Mach-Zehnder interferometer 102, and a liquid crystal filter or the like may be used in the phase adjustment unit 1023.

In addition, the reflection unit 103 may be formed using reflection at a bonding portion between optical fiber connectors in addition to a half mirror.

In addition, the return light that is reflected by the reflection unit 103, passes through the Mach-Zehnder interferometer 102 in a reversed direction, and is output from the second optical path 1022 side may be received by the photodetector unit 106, and the control unit 107 may control the phase adjustment amount of the phase adjustment unit 1023 based on the intensity of the return light.

In the aforementioned description, while it is assumed that the phase $\phi(t)$ of the optical signal input to the optical receiver 100 can have a value 0 or $\pi$ with the same probability on average, this assumption may not be correct depending on the actual transmission data or the encoding scheme (such as an NRZ code or an RZ code). In this case, the control unit 107 may control the phase adjustment amount $\Delta\theta$ introduced by the phase adjustment unit 1023 such that the time average of the intensity P of the return light measured by the photodetector unit 106 has an optimal value deviated from the maximum value by a predetermined amount. Such an optimal value may be determined by previously measuring the time average of the intensity P that can provide an optimal transmission characteristic. As a special case, such an optimal value may be a minimum value of the time average of the intensity P.

Figure 4:
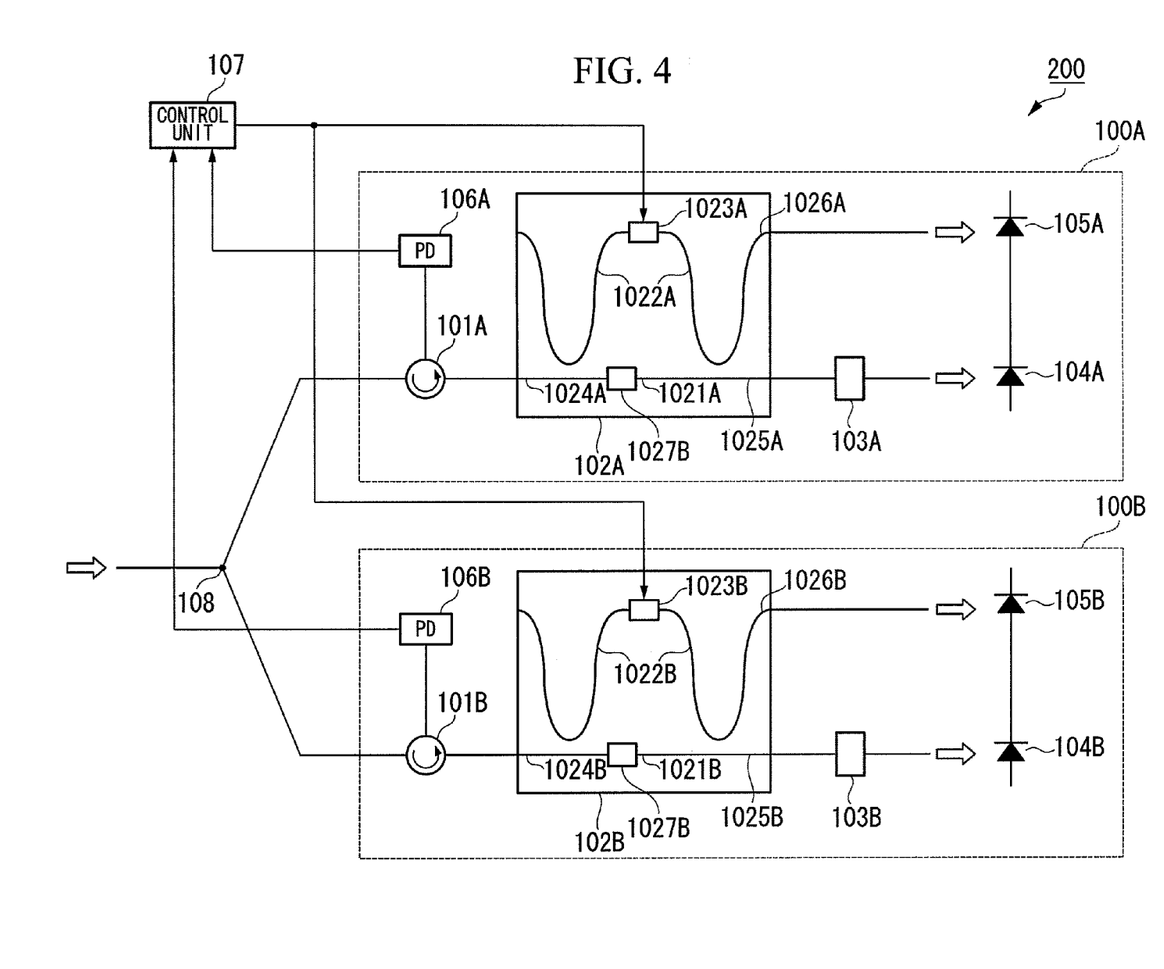
FIG. 4 is a schematic configuration diagram illustrating an optical receiver (using DQPSK) according to an embodiment of the present invention.

FIG. 4 is a schematic configuration diagram illustrating an optical receiver in the case where a PQPSK (Differential Quadrature Phase Shift Keying) is used as the differential phase shift modulation method. In FIG. 4, the optical receiver 200 includes a first light-receiving unit 100A, a second light-receiving unit 100B, a control unit 107, and a branching unit 108. The first light-receiving unit 100A includes an optical circulator 101A, a Mach-Zehnder interferometer 102A, a reflection unit 103A, and a photodetector unit 104A to 106A similar to the optical receiver 100 of FIG. 1. The Mach-Zehnder interferometer 102A further includes a phase introducing unit 1027A in the middle of the first optical path 1021A. The second light-receiving unit 100B has the same configuration.

The optical receiver 200 receives the optical signal that has been differential-quadrature-phase-shift-keying-modulated (DQPSK) by an optical transmitter (not shown) and transmitted through the transmission path. The optical signal transmitted from the optical transmitter is branched by the branching unit 108 and input to the first and second light-receiving units 100A and 100B.

In the same manner as the optical receiver 100 of FIG. 1, the optical signal input to the first light-receiving unit 100A is input to the first input/output unit 1024A of the Mach-Zehnder interferometer 102A through the optical circulator 101A and further branched into the first optical path 1021A and the second optical path 1022A within the Mach-Zehnder interferometer 102A. In the same manner as the optical receiver 100 of FIG. 1, the length of the optical path of the second optical path 1022A is set to be longer than the length of the first optical path 1021A such that the light propagating through the second optical path has a delay amount (phase difference) corresponding to a single bit of the DQPSK signal with respect to the light propagating through the first optical path 1021A. Furthermore, in the optical receiver 200 of FIG. 4, a phase of $\pi/4$ is introduced to the light propagating through the first optical path 1021A by the phase introducing unit 1027A.

In the same manner as the optical receiver 100 of FIG. 1, the optical signal that propagates through the first optical path 1021A to introduce a phase of $\pi/4$ and the optical signal that propagates through the second optical path 1022A to have a phase difference corresponding to a single bit with respect to the optical signal are combined again in the Mach-Zehnder interferometer 102A and interfere with each other so as to be output from the second input/output unit 1025A and the third input/output unit 1026A as output light.

In the same manner as the optical receiver 100 of FIG. 1, a part of the output light output from the second input/output unit 1025A is reflected by the reflection unit 103A and input to the second input/output unit 1025A again, and propagates through the Mach-Zehnder interferometer 102A in a reversed direction, so that the return light is output from the first input/output unit 1024A. In the same manner as the optical receiver 100 of FIG. 1, the return light is received by the photodetector unit 106A through the optical circulator 101A and is converted into an electric signal. The electric signal representing the intensity of the return light obtained by the photodetector unit 106A is transmitted to the control unit 107.

On the other hand, in the second light-receiving unit 100B, a phase of $-\pi/4$ is introduced by the phase introducing unit 1027B to the light propagating through the first optical path 1021B. As a result, a relative phase difference between the phase of the optical signal in the first light-receiving unit 100A and the phase of the optical signal in the second light-receiving unit 100B becomes $\pi/2$. Parts other than the phase introducing unit 1027B of the second light-receiving unit 100B are the same as those of the first light-receiving unit 100A.

In the optical receiver 200 of FIG. 4, the control unit 107 determines the phase adjustment amount in the phase adjustment unit 1023A of the first light-receiving unit 100A and the phase adjustment amount in the phase adjustment unit 1023B of the second light-receiving unit 100B based on the electric signal representing the intensity of the return light obtained by the photodetector unit 106A of the first light-receiving unit 100A and the electric signal representing the intensity of the return light obtained by the photodetector unit 106B of the second light-receiving unit 100B.

For example, the control unit 107 controls the phase adjustment amount introduced by the phase adjustment unit 1023A such that the time average of the intensity PA of the return light measured by the photodetector unit 106A is maximized. At the same time, the control unit 107 controls the phase adjustment amount introduced by the phase adjustment unit 1023B such that the time average of the intensity PB of the return light measured by the photodetector unit 106B is maximized. As a result of this control, a delay amount exactly corresponding to a single bit is introduced by the first and second optical paths 1021A and 1022A of the Mach-Zehnder interferometer 102A and the first and second optical paths 1021B and 1022B of the Mach-Zehnder interferometer 102B at all times. Therefore, the optical receiver 200 can demodulate the optical signal based on the received optical signal based on a differential phase shift keying (DQPSK) method with high accuracy. As described above, the phase adjustment amount may be controlled such that the time averages of the intensities PA and PB of the return light measured by the photodetector units 106A and 106B, respectively, have optimal values deviated by a predetermined amount from the maximum values. As a special case, the phase adjustment amount may be controlled such that the time averages of the intensities PA and PB of the return light have the minimum values.

INDUSTRIAL APPLICABILITY

In the optical receiver according to the present invention, it is possible to demodulate the optical signal based on a differential phase shift modulation method with high accuracy using a simple and easy configuration having little loss. Therefore, the present invention is very useful industrially.

What is claimed is:

1. An optical receiver that receives a differential-phase-shift-keying-modulated optical signal, the optical receiver comprising:
    an interferometer that branches the received optical signal into two paths, introduces a phase difference corresponding to a single bit between the two branched optical signals, and generates interference between the two optical signals after introduction of the phase difference so as to output two output optical signals;
    a reflection means that reflects one of the output optical signals from the interferometer to return one of the output optical signals to the interferometer;
    a detection means that detects the return light output after being reflected by the reflection means and passing through the interferometer in a reversed direction to the received optical signal; and
    a phase difference control means that adjusts the phase difference introduced by the interferometer based on an intensity of the return light detected by the detection means.

2. The optical receiver according to claim 1, wherein the phase difference control means adjusts the phase difference such that an average intensity of the return light is maximized.

3. The optical receiver according to claim 1, wherein the phase difference control means adjusts the phase difference such that an average intensity of the return light is minimized.

4. An optical receiver for receiving a differential-phase-shift-keying-modulated optical signal, the optical receiver comprising:
- a branching means that branches the received optical signal into two paths;
- a phase difference introducing means that introduces a relative phase difference of π/2 between two optical signals branched by the branching means;
- a first interferometer that branches one of the optical signals branched by the branching means into two paths, introduces a phase difference corresponding to a single bit between the two branched optical signals, and generates interference between the two optical signals after introducing the phase difference so as to output two output optical signals;
- a first reflection means that reflects one of the output optical signals from the first interferometer to return one of the output optical signals to the first interferometer;
- a first detection means that detects the return light output after being reflected at the first reflection means and passing through the first interferometer in a reversed direction;
- a second interferometer that branches the other optical signal branched by the branching means into two paths, introduces a phase difference corresponding to a single bit between the two branched optical signals, and generates interference between the two optical signals after introducing the phase difference so as to output two output optical signals;
- a second reflection means that reflects one of the output optical signals from the second interferometer to return one of the output signals to the second interferometer;
- a second detection means that detects the return light output after being reflected at the second reflection means and passing through the second interferometer in a reversed direction; and
- a phase difference control means that adjusts the phase differences introduced by the first and second interferometers based on at least one of intensities of the return light detected by the first and second detection means.

5. The optical receiver according to claim 4, wherein the phase difference control means adjusts the phase difference such that an average intensity of the return light detected by the first detection means is maximized or minimized, or an average intensity of the return light detected by the second detection means is maximized or minimized.

6. An optical receiver that receives a differential-phase-shift-keying-modulated optical signal, the optical receiver comprising:
- an first interferometer that branches the received optical signal into two paths, introduces a phase difference corresponding to a single bit between the two branched optical signals, and generates interference between the two optical signals after introduction of the phase difference so as to output two output optical signals;
- a first reflection means that reflects one of the output optical signals from the first interferometer to return one of the output optical signals to the first interferometer;
- a first detection means that detects the return light output after being reflected by the first reflection means and passing through the first interferometer in a reversed direction to the received optical signal; and
- a phase difference control means that adjusts the phase difference introduced by the first interferometer based on an intensity of the return light detected by the first detection means.

7. The optical receiver according to claim 6, the optical receiver further comprising:
- a branching means that branches the received optical signal into two paths;
- a phase difference introducing means that introduces a relative phase difference of π/2 between two optical signals branched by the branching means;
- an second interferometer that branches the optical signal branched by the branching means into two paths, introduces a phase difference corresponding to a single bit between the two branched optical signals, and generates interference between the two optical signals after introduction of the phase difference so as to output two output optical signals;
- a second reflection means that reflects one of the output optical signals from the second interferometer to return one of the output optical signals to the second interferometer;
- a second detection means that detects the return light output after being reflected by the second reflection means and passing through the second interferometer in a reversed direction to the received optical signal; wherein the first interferometer inputs the optical signal branched by the branching means, and the phase difference control means adjusts the phase differences introduced by the first and second interferometers based on at least one of intensities of the return light detected by the first and second detection means.

* * * * *

UNITED STATES PATENT AND TRADEMARK OFFICE
CERTIFICATE OF CORRECTION

| | | |
|---|---|---|
| PATENT NO. | : 8,577,225 B2 | Page 1 of 1 |
| APPLICATION NO. | : 12/935252 | |
| DATED | : November 5, 2013 | |
| INVENTOR(S) | : Mure et al. | |

It is certified that error appears in the above-identified patent and that said Letters Patent is hereby corrected as shown below:

On the title page item [75]: "Toshio Kataoka, Chiyoda-ku (JP)" should read -- Toshio Kataoka, Tokyo (JP) --

Signed and Sealed this
Fifteenth Day of July, 2014

Michelle K. Lee
*Deputy Director of the United States Patent and Trademark Office*